(12) United States Patent
Tang

(10) Patent No.: US 11,968,673 B2
(45) Date of Patent: Apr. 23, 2024

(54) UPLINK SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 633 days.

(21) Appl. No.: 17/131,854

(22) Filed: Dec. 23, 2020

(65) Prior Publication Data
US 2021/0120546 A1    Apr. 22, 2021

Related U.S. Application Data

(63) Continuation of application No. PCT/CN2019/093032, filed on Jun. 26, 2019.

(30) Foreign Application Priority Data

Jun. 26, 2018   (CN) .......................... 201810672006.1

(51) Int. Cl.
*H04W 72/04*   (2023.01)
*H04L 1/1812*   (2023.01)
(Continued)

(52) U.S. Cl.
CPC .......... *H04W 72/21* (2023.01); *H04L 1/1812* (2013.01); *H04L 5/0055* (2013.01); *H04W 72/02* (2013.01); *H04W 74/0808* (2013.01)

(58) Field of Classification Search
CPC . H04W 72/21; H04W 74/006; H04W 72/044; H04W 72/0446; H04W 74/0808;
(Continued)

(56) References Cited

U.S. PATENT DOCUMENTS

| 10,986,631 | B2* | 4/2021 | Xiong | .................... | H04W 72/21 |
| 11,742,996 | B2* | 8/2023 | Bae | ........................ | H04L 5/0055 |
| | | | | | 370/329 |

(Continued)

FOREIGN PATENT DOCUMENTS

| CN | 106851839 A | 6/2017 |
| CN | 106982111 A | 7/2017 |

(Continued)

OTHER PUBLICATIONS

International Search Report with English Translation for PCT/CN2019/093032 dated Aug. 26, 2019.

(Continued)

*Primary Examiner* — Jung Liu
(74) *Attorney, Agent, or Firm* — Young Basile Hanlon & MacFarlane, P.C.

(57) ABSTRACT

An uplink signal transmission method, a terminal device, and a network device are provided. The method comprises: a terminal device determining a first time frequency resource which is used to transmit uplink data acquired by a first transmission block performing rate matching, and a second time frequency resource which is used to transmit UCI, the UCI being used to demodulate the uplink data, the first time frequency resource occupying N sub-bands in a frequency domain, the second time frequency resource being a resource in the first time frequency resource, and the second time frequency resource occupying M sub-bands of the N sub-bands in the frequency domain, where N≥2, M≥1, and N and M are positive integers; and the terminal device performing channel detection on at least one of the N sub-bands, and determining the transmission of the uplink data and the UCI according to a detection result.

12 Claims, 5 Drawing Sheets

(51) Int. Cl.
  *H04L 5/00* (2006.01)
  *H04W 72/02* (2009.01)
  *H04W 72/21* (2023.01)
  *H04W 74/0808* (2024.01)

(58) Field of Classification Search
  CPC .......... H04W 72/02; H04L 67/12; H04L 1/08;
      H04L 5/0053; H04L 1/1822; H04L
      1/1896; H04L 1/1812; H04L 5/0091;
      H04L 5/0055; H04L 5/0044; H04L 1/189
  See application file for complete search history.

(56) References Cited

U.S. PATENT DOCUMENTS

| | | | |
|---|---|---|---|
| 2016/0278074 A1* | 9/2016 | Yang | H04L 1/1812 |
| 2017/0289440 A1* | 10/2017 | Konishi | H04N 25/70 |
| 2020/0007280 A1* | 1/2020 | Kim | H04L 5/0012 |
| 2020/0007284 A1* | 1/2020 | Qu | H04L 27/2607 |
| 2020/0037314 A1* | 1/2020 | Xiong | H04L 1/08 |
| 2020/0295892 A1* | 9/2020 | Oh | H04L 67/12 |
| 2020/0351869 A1* | 11/2020 | Oh | H04W 72/044 |
| 2023/0189275 A1* | 6/2023 | Oh | H04W 72/21 |
| | | | 370/329 |

FOREIGN PATENT DOCUMENTS

| | | |
|---|---|---|
| CN | 107026723 A | 8/2017 |
| CN | 107624265 A | 1/2018 |
| WO | 2017170814 A1 | 10/2017 |
| WO | 2017195853 A1 | 11/2017 |
| WO | 2018045919 A1 | 3/2018 |

OTHER PUBLICATIONS

3GPP TSG RAN WG1 Meeting #92 R1-1802535; Athens, Greece, February 26-Mar. 2, 2018.
China First Office Action with English Translation for CN Application 202110267494.X dated Jul. 27, 2022.
Korean First Office Action with English Translation for KR Application 1020207038013 dated Sep. 29, 2022.
Australian Examination Report for AU Application 2019296183 dated Feb. 9, 2022. (3 pages).
Indian Examination Report for IN Application 202117000476 dated Jan. 1, 2022. (7 pages).
Japanese Office Action with English Translation for JP Application 2021520268 dated Mar. 4, 2022. (13 pages).
3GPP TSG RAN WGI Meeting #91 Reno, USA, R1-1719499, Huawei, HiSilicon, Remaining issues for AUL HARQ operation, Nov. 27-Dec. 1, 2017.
3GPP TSG RAN WG1 Meeting #92Sanya, China, R1-1804405, Samsung, Potential physical layer procedures for NR-U, Apr. 16-Apr. 20, 2018.
3GPP TSG RAN WG1 Meeting #93Busan, Korea, R1-1806111, Nokia, Nokia Shanghai Bell, On support of UL transmission with configured grants in NR-U, May 21-25, 2018.
3GPP RAN WG1 Meeting #93 Busan, Korea, R1-1806968, InterDigital Inc., BWP operation in unlicensed spectrum, May 21-25, 2018.
3GPP TSG RAN WG1 Meeting #94Gothenburg, Sweden, R1-1808324, ZTE, Discussion on configured grant for NR-U, Aug. 20-24, 2018.
3GPP TSG-RAN WG2 #99Berlin, Germany, Nokia, R2-1708483, Nokia Shanghai Bell, Autonomous uplink access, Aug. 21-25, 2017.
S. Ajey et al., On Performance of MIMO-OFDM Based LTE Systems, Design & Development, 5 pages.
3GPP TSG RAN WG1 Meeting #92bis Sanya, China, R1-180xxxx, MCC Support, Draft Report of 3GPP TSG RAN WG1 #92 v0.3.0 (Athens, Greece, Feb. 26-Mar. 2, 2018).
Australian Examination Report for AU Application 2019296183 dated Aug. 16, 2021. (4 pages).
Extended European Search Report for EP Application 19825417.9 dated Jul. 15, 2021. (16 pages).
Communication pursuant to Article 94(3) EPC for EP Application 19825417.9 dated Jul. 20, 2023. (8 pages).
Korean Notice of Allowance with English Translation for KR Application 1020207038013 dated Jun. 28, 2023. (4 pages).
Samsung, On UCI Multiplexing with Multi-Layer UL Data Transmissions, 3GPP TSG RAN WG1 #88bis, R1-1705398, Apr. 3-7, 2017. (3 pages).
NTT Docomo, Inc., Sequence-based PUCCH for UCI of up to 2 bits, 3GPP TSG RAN WG1 NR Ad-Hoc#2, R1-1711098, Jun. 27-30, 2017. ( 14 pages).
Indian Hearing Notice for IN Application 202117000476 mailed Dec. 5, 2023. (2 pages).

* cited by examiner

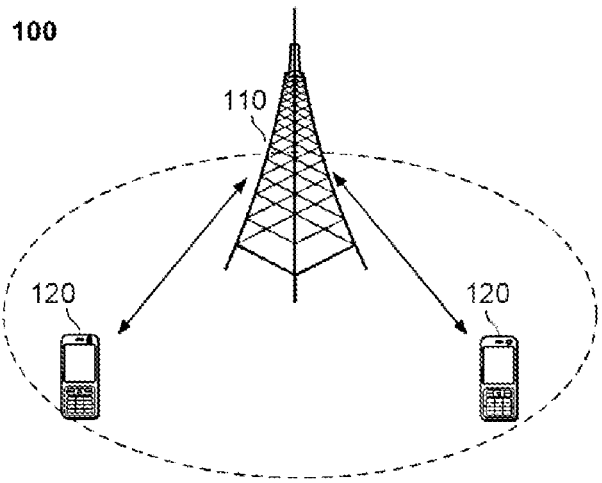

| A terminal device determines first time-frequency resources and second time-frequency resources, the first time-frequency resources being used for transmitting uplink data obtained by rate matching of a first transport block, the second time-frequency resources being used for transmitting UCI, and the UCI being used for demodulating the uplink data, wherein the first time-frequency resources occupy N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers. | 210 |

| The terminal device performs channel sensing on at least one of the N sub-bands, and determines the transmission of the uplink data and the UCI according to the sensing result | 220 |

FIG. 2A

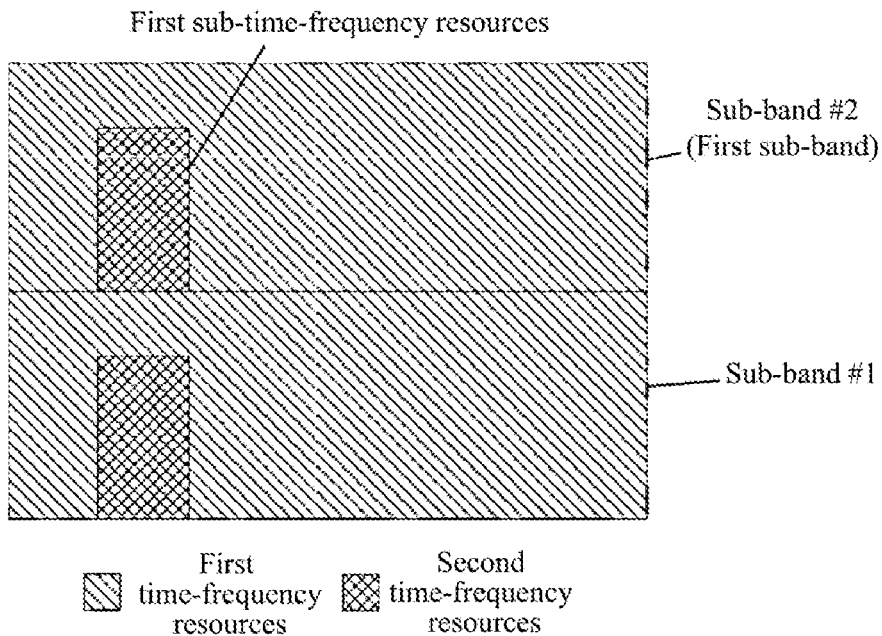

A network device receives uplink data sent by a terminal device through resources in first time-frequency resources on K sub-bands in N sub-bands and UCI sent through resources in second time-frequency resources on the K sub-bands, the first time-frequency resources being used for transmitting the uplink data obtained by rate matching of a first transport block, the second time-frequency resources being used for transmitting the UCI, and the UCI being used for demodulating the uplink data, wherein the first time-frequency resources occupy the N sub-bands in a frequency domain, the second time-frequency resources are resources in the first time-frequency resources, and the second time-frequency resources occupy M sub-bands in the N sub-bands in the frequency domain, where $N \geq 2$ and $M \geq 1$, both N and M being positive integers; and $1 \leq K \leq N$, K being a positive integer.

> A network device receives uplink data sent by a terminal device through first time-frequency resources and UCI sent through second time-frequency resources, the first time-frequency resources being used for transmitting the uplink data obtained by rate matching of a first transport block, the second time-frequency resources being used for transmitting the UCI, and the UCI being used for demodulating the uplink data, wherein the first time-frequency resources occupy the N sub-bands in a frequency domain, the second time-frequency resources are resources in the first time-frequency resources, and the second time-frequency resources occupy M sub-bands in the N sub-bands in the frequency domain, where $N \geq 2$ and $1 \leq M < N$, both N and M being positive integers. ⟵ 320

FIG. 3B

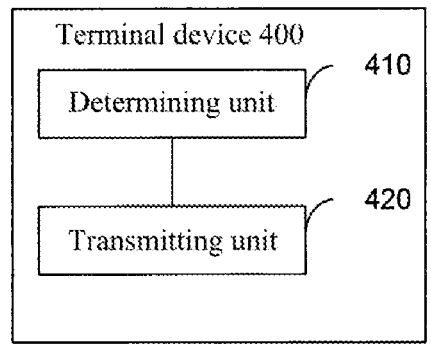

FIG. 4

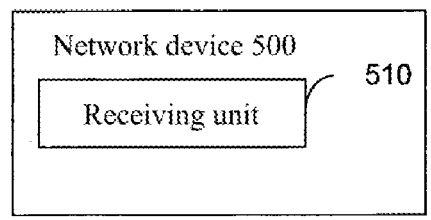

FIG. 5A

UPLINK SIGNAL TRANSMISSION METHOD, TERMINAL DEVICE, AND NETWORK DEVICE

CROSS-REFERENCE TO RELATED APPLICATION(S)

The present application is a continuation application of International PCT Application No. PCT/CN2019/093032, filed on Jun. 26, 2019, which claims priority to Chinese Patent Application No. 201810672006.1, filed on Jun. 26, 2018. The present application claims priority and the benefit of the above-identified applications and the above-identified applications are incorporated by reference herein in their entirety.

TECHNICAL FIELD

Implementations of the present disclosure relate to the technical field of communication, and more particularly, to a method for transmitting uplink signals, a terminal device and a network device.

BACKGROUND

In a new radio (NR) system, such as a 5G application, an unlicensed spectrum can be adopted, that is, an NR technology can be used for communication on a channel of the unlicensed spectrum. In order to enable various wireless communication systems using the unlicensed spectrum for wireless communication to coexist friendly on the spectrum, some countries or regions stipulate regulatory requirements that must be met when the unlicensed spectrum is used. For example, in Europe, a communication device follows a listen-before-talk (LBT) principle, that is, before the communication device transmits signals on the channel of the unlicensed spectrum, channel sensing needs to be conducted on the channel of the unlicensed spectrum. Only when a result of the channel sensing is that the channel is idle, can the communication device transmit signals; if the result of the channel sensing is that the channel is busy, the communication device cannot transmit signals.

However, in a new radio-unlicensed (NR-U) system, when a terminal device implements multiple sub-bands-based data transmission with configure grant uplink, time-frequency resources used by the terminal device for uplink transmission are pre-configured by the network device, and the terminal device can transmit uplink data and uplink control information (UCI) used for demodulating the uplink data on the pre-configured time-frequency resources. However, in some cases, for example, the sub-bands to which the UCI is mapped cannot be transmitted due to an LBT failure, such that the UCI cannot be transmitted correctly.

Therefore, there is an urgent need for a method for transmitting uplink signals on an unlicensed spectrum, so as to realize correct transmission of UCI used for demodulating uplink data on the unlicensed spectrum.

SUMMARY

Implementations of the present disclosure provide a method for transmitting uplink signals, a terminal device and a network device, so as to realize correct transmission of UCI used for demodulating uplink data on an unlicensed spectrum.

In a first aspect, there is provided a method for transmitting uplink signals, including:

determining, by a terminal device, first time-frequency resources and second time-frequency resources, the first time-frequency resources being used for transmitting uplink data obtained by rate matching of a first transport block, the second time-frequency resources being used for transmitting uplink control information (UCI), and the UCI being used for demodulating the uplink data, wherein the first time-frequency resources occupy N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers; and performing, by the terminal device, channel sensing on at least one of the N sub-bands, and determining the transmission of the uplink data and the UCI according to the sensing result.

In a second aspect, there is provided another method for transmitting uplink signals, including:

receiving, by a network device, uplink data sent by a terminal device through resources in first time-frequency resources on K sub-bands in N sub-bands and uplink control information (UCI) sent through resources of second time-frequency resources on the K sub-bands, the first time-frequency resources being used for transmitting the uplink data obtained by rate matching of a first transport block, the second time-frequency resources being used for transmitting the UCI, and the UCI being used for demodulating the uplink data, wherein the first time-frequency resources occupy the N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers; and 1≤K≤N, K being a positive integer.

In a third aspect, there is provided a terminal device for implementing the method according to the first aspect described above or various implementation modes thereof.

Specifically, the terminal device includes function modules for implementing the method according to the first aspect described above or various implementation modes thereof.

In a fourth aspect, there is provided a network device for implementing the method according to the second aspect described above or various implementation modes thereof.

Specifically, the network device includes function modules for implementing the method according to the second aspect described above or various implementation modes thereof.

In a fifth aspect, there is provided a communication device including a processor and a memory. The memory is used for storing a computer program, and the processor is used for calling and running the computer program stored in the memory to implement the method according to any of the first aspect and the second aspect described above or various implementation modes thereof.

In a sixth aspect, there is provided a chip used for implementing the method according to the first aspect and the second aspect described above or various implementation modes thereof.

Specifically, the chip includes a processor used for calling and running a computer program from a memory, so that a device with the chip installed therein implements the method according to any of the first aspect and the second aspect described above or various implementation modes thereof.

In a seventh aspect, there is provided a computer readable storage medium used for storing a computer program that causes a computer to implement the method according to any of the first aspect and the second aspect described above or various implementation modes thereof.

In an eighth aspect, there is provided a computer program product including computer program instructions that cause a computer to implement the method according to any of the first aspect and the second aspect described above or various implementation modes thereof.

In a ninth aspect, there is provided a computer program which, when running on a computer, causes the computer to implement the method according to any of the first aspect and the second aspect described above or various implementation modes thereof.

According to the technical solution described above, the first time-frequency resources and the second time-frequency resources are determined by the terminal device, the first time-frequency resources being used for transmitting the uplink data obtained by rate matching of the first transport block, the second time-frequency resources being used for transmitting the UCI, and the UCI being used for demodulating the uplink data, wherein the first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers, such that the terminal device can perform channel sensing on at least one of the N sub-bands, and determine the transmission of the uplink data and the UCI according to the sensing result. Since the time-frequency resources for transmitting the UCI used for demodulating the uplink data occupy multiple sub-bands, the technical problem that the UCI used for demodulating the uplink data cannot be correctly transmitted because a certain sub-band to which the UCI is mapped cannot be used for transmission due to the LBT failure can be avoided, thereby improving the probability that the UCI used for demodulating the uplink data is correctly demodulated.

BRIEF DESCRIPTION OF DRAWINGS

FIG. 1 is a schematic diagram of an architecture of a communication system according to an implementation of the present disclosure.

FIG. 2A is a schematic diagram of a method for transmitting uplink signals according to an implementation of the present disclosure.

FIG. 2B is a schematic diagram of first sub-time-frequency resources on sub-bands in the implementation corresponding to FIG. 2A.

FIG. 3A is a schematic diagram of another method for transmitting uplink signals according to an implementation of the present disclosure.

FIG. 3B is a schematic diagram of still another method for transmitting uplink signals according to an implementation of the present disclosure.

FIG. 4 is a schematic block diagram of a terminal device according to an implementation of the present disclosure.

FIG. 5A is a schematic block diagram of a network device according to an implementation of the present disclosure.

DETAILED DESCRIPTION

Figure 5B:
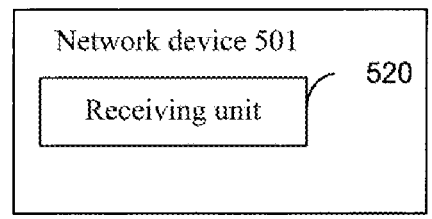
FIG. 5B is a schematic block diagram of another network device according to an implementation of the present disclosure.

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

The technical solution of the implementations of the present disclosure can be applied to both licensed spectrum and unlicensed spectrum, and this is not restricted in the implementations of the present disclosure.

Illustratively, a communication system 100 applied in an implementation of the present disclosure is shown in FIG. 1. The communication system 100 may include a network device 110, which may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. The "terminal device" as used herein includes, but is not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or an apparatus of another terminal device configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular telephone; a personal communication system (PCS) terminal capable of combining a cellular wireless telephone with data processing, facsimile, and data communication abilities; a personal digital assistant (PDA) that may include a radio telephone, a pager, internet/intranet access, a Web browser, a memo pad, a calendar, a BeiDou Navigation Satellite System (BDS) and Global Positioning System (GPS) receiver; and a conventional laptop and/or palmtop receiver or other electronic devices including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, device to device (D2D) communication may be conducted between the terminal devices 120.

Optionally, the 5G system or 5G network may be referred to as a new radio (NR) system or a NR network.

FIG. 1 illustrates schematically one network device and two terminal devices. Optionally, the wireless communication system 100 may include multiple network devices, and other numbers of terminal devices may be included within the coverage area of each network device, and this is not restricted in the implementations of the present disclosure.

Optionally, the communication system 100 may include other network entities, such as a network controller and a mobile management entity, and this is not restricted in implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as other network entities, such as network controllers and mobile management entities, and this is not restricted in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, A and B, and B alone. In addition, the symbol "/" herein generally indicates that there is a "or" relationship between the associated objects before and after the symbol "/".

FIG. 2A is a schematic flow chart of a method 200 for transmitting uplink signals according to an implementation of the present disclosure, as shown in FIG. 2A.

In 210, a terminal device determines first time-frequency resources and second time-frequency resources, the first time-frequency resources are used for transmitting uplink data obtained by rate matching of a first transport block, the second time-frequency resources being used for transmitting uplink control Information (UCI), and the UCI being used for demodulating the uplink data.

The first time-frequency resources occupy N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers.

In 220, the terminal device performs channel sensing on at least one of the N sub-bands, and determines the transmission of the uplink data and the UCI according to the sensing result.

In this implementation, the terminal device may determine the first time-frequency resources and the second time-frequency resources, the first time-frequency resources being used for transmitting the uplink data obtained by rate matching of the first transport block, the second time-frequency resources being used for transmitting the UCI, and the UCI being used for demodulating the uplink data. The first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers. After determining the first time-frequency resources and the second time-frequency resources, the terminal device can perform the channel sensing on at least one of the N sub-bands, and determine the transmission of the uplink data and the UCI according to the sensing result.

Optionally, in an implementation of the present disclosure, a size of a sub-band is the same as a unit bandwidth at which the channel sensing is performed by the terminal device, or the size of the sub-band is an integer multiple of the unit bandwidth at which the channel sensing is performed by the terminal device. For example, assuming that the unit bandwidth at which the channel sensing is performed by the terminal device is 20 MHz, the size of the sub-band may be 20 MHz, 40 MHz or 60 MHz, etc., and this is not particularly restricted in the present implementation.

It should be understood that in an implementation of the present disclosure, the first time-frequency resources occupying the N sub-bands in the frequency domain may mean that the first time-frequency resources occupy all resources on the N sub-bands in the frequency domain, or the first time-frequency resources occupy part of the resources on the N sub-bands in the frequency domain, and this is not particularly restricted in the present implementation.

It should be understood that in an implementation of the present disclosure, the second time-frequency resources occupying the M sub-bands in the N sub-bands in the frequency domain may mean that the second time-frequency resources occupy all resources on the M sub-bands in the frequency domain, or the second time-frequency resources occupy part of the resources on the M sub-bands in the frequency domain, and this is not particularly restricted in the present implementation.

Optionally, in an implementation of the present disclosure, a mode in which the uplink data is transmitted on the first time-frequency resources is a code block group (CBG) transmission mode, wherein resources in the first time-frequency resources on each of the N sub-bands are used for transmitting an integer number of CBGs.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

Optionally, the first sub-band is one of the M sub-bands.

Optionally, the first sub-band is any one of the M sub-bands.

Optionally, the resources in the second time-frequency resources on each of the M sub-bands are used to transmit all the information included in the UCI. Further, optionally, the resources in the second time-frequency resources on each of the M sub-bands are used to repeatedly transmit UCI data obtained by UCI information rate matching, or the resources in the second time-frequency resources on each of the M sub-bands are used to transmit different redundancy versions of UCI data obtained by the UCI information rate matching. For example, if M=2, sub-band 1 is used to transmit the redundancy version 0 of UCI data, and sub-band 2 is used to transmit the redundancy version 2 of UCI data. Optionally, obtaining the UCI data by the UCI information rate matching includes obtaining UCI data matched with the second time-frequency resources through processes such as coding, interleaving, bit deletion and modulation of the UCI.

Optionally, all the information included in the UCI may include but is not limited to at least one of:
- a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Optionally, in an implementation of the present disclosure, the indicator for COT sharing may be used to indicate whether resources in a transmission opportunity subsequent to successful channel access of the terminal device can be used by other devices for communication transmission. For example, if the indicator for COT sharing indicates that the COT can be shared, the resources in the transmission opportunity subsequent to the successful channel access of the terminal device can be used by another communication device for communication transmission, where another communication device can be a network device or another terminal device different from the terminal device mentioned above, and this is not restricted in an implementation of the present disclosure.

In this mode, as long as one sub-band can be used for transmission, the UCI can be correctly demodulated, thus ensuring the correct transmission of the uplink data on the sub-band. Because the UCI in all sub-bands needs to be indicated on each sub-band, signaling overhead is relatively large.

In another specific implementation process, resources in the second time-frequency resources on the i-th sub-band in the M sub-bands can be specifically used to transmit the $(k*M+i)$-th modulation symbol included in the UCI, where $1 \leq i \leq M$, and $k \geq 0$, both i and k being integers.

For example, taking the UCI mapping to four sub-bands as an example, during the mapping, modulation symbol 1 is on sub-band 1, modulation symbol 2 is on sub-band 2, modulation symbol 3 is on sub-band 3, modulation symbol 4 is on sub-band 4, modulation symbol 5 is on sub-band 1, modulation symbol 6 is on sub-band 2, modulation symbol 7 is on sub-band 3, modulation symbol 8 is on sub-band 4, and so on.

In another specific implementation process, resources in the second time-frequency resources on the p-th sub-band of the M sub-bands can be specifically used to transmit the $(k*M+p)$-th bit included in the UCI, where $1 \leq p \leq M$, and $k \geq 0$, both p and k being integers.

For example, taking the UCI mapping to 4 sub-bands as an example, during the mapping, the 1st, 5th, 9th, 13th, ..., $(k*M+1)$-th bits are on sub-band 1; the 2nd, 6th, 10th, 14th, $(k*M+2)$-th bits are on sub-band 2; the 3rd, 7th, 11th, 15th, ..., $(k*M+3)$-th bits are on sub-band 3; and the 4th, 8th, 12th, 16th, ..., $(k*M+4)$-th bits are on sub-band 4. If a modulation order is 2, on sub-band 1, the first modulation symbol includes the first and fifth bits, the second modulation symbol includes the ninth and thirteenth bits, etc.; on sub-band 2, the first modulation symbol includes the second and sixth bits, the second modulation symbol includes the tenth and fourteenth bits, etc.; and so on.

Optionally, in a possible implementation mode of the implementation, a size of the second time-frequency resources may be determined by a code rate of the UCI.

It should be understood that in the case of low code rate, even if the sub-bands to which the UCI is mapped cannot be used for transmission due to the LBT failure, there is a probability that the UCI mapped to other sub-bands can be demodulated correctly.

Optionally, in a possible implementation mode of the implementation, the code rate of the UCI may be determined by the value of M.

For example, when M=1, the code rate can be a reference value, which is denoted as x; when M=2, the code rate can be x/2; when M=3, the code rate can be x/3; and when M=4, the code rate can be x/4. As an example but not a limitation, the value of x may be ½.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

Optionally, the second sub-band is one of the M sub-bands.

Optionally, the second sub-band is any one of the M sub-bands.

For example, the first sub-UCI may include but is not limited to at least one of:
a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:
a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In this mode, if there is a sub-band that cannot be used for transmission, only the UCI of that sub-band will be affected such that it cannot be demodulated correctly, and the UCI of other sub-bands that can be used for transmission can still be demodulated correctly, thus ensuring the correct transmission of the uplink data on the sub-bands.

In another specific implementation process, after 220, the terminal device may further determine that K sub-bands in the N sub-bands can be used according to the sensing result, where $1 \le K \le N$, K being a positive integer. Then, the terminal device can send the uplink data through resources in the first time-frequency resources on the K sub-bands, and send the UCI through resources in the second time-frequency resources on the K sub-bands.

In this implementation process, when the terminal device detects that only K sub-bands in the N sub-bands can be used due to the LBT, for the case that there are transmission resources for the UCI on all sub-bands, i.e., the N sub-bands (i.e., M=N), although the terminal device may not get the transmission opportunity for all sub-bands (i.e., K<N) in the event of the LBT, since there are the transmission resources for the UCI on each sub-band, as long as one sub-band can be used for transmission, the UCI can be demodulated correctly, thereby ensuring the correct transmission of the uplink data on the sub-bands.

In a specific implementation process, after 220, the terminal device may further determine that K sub-bands in the N sub-bands can be used according to the sensing result, where M<N, and $1 \le K \le N$, K being a positive integer. Since the terminal device cannot guarantee that the UCI can be transmitted normally, the terminal device may not send the uplink data and the UCI on the K sub-bands.

In this implementation process, when the terminal device detects that only K sub-bands in the N sub-bands can be used due to the LBT, for the case that there are transmission resources for the UCI on only part of the sub-bands, i.e., the M sub-bands (i.e. M<N), if it is determined that the terminal device do not get the transmission opportunity for all sub-bands (i.e., K<N), the terminal device may not implement the transmission of the uplink data and the UCI any more.

In a specific implementation process, after 220, the terminal device may further determine that K sub-bands in the N sub-bands can be used according to the sensing result, where $1 \le K < N$, K being a positive integer, wherein the M sub-bands are included in the K sub-bands. Then, the terminal device can send the uplink data and the UCI on the K sub-bands.

In this implementation process, when the terminal device detects that only K sub-bands in the N sub-bands can be used due to the LBT, for the case that there are transmission resources for the UCI on only part of the sub-bands, i.e., the M sub-bands (i.e. M<N), if the terminal device determines that the M sub-bands are included in the K sub-bands which can be used, the terminal device can normally implement the transmission of the UCI on the transmission resources for the UCI in the M sub-bands. In this way, the UCI can be correctly demodulated, thus ensuring the correct transmission of the uplink data on the sub-bands.

It should be noted that under the premise of no conflict, various implementations described in the present disclosure and/or technical features in each of the implementations can be arbitrarily combined with each other, and the technical solutions obtained subsequent to the combination should also fall into the protection scope of the present disclosure.

In this implementation, according to the technical solution described above, the first time-frequency resources and the second time-frequency resources are determined by the terminal device, the first time-frequency resources being used for transmitting the uplink data obtained by rate matching of the first transport block, the second time-frequency resources being used for transmitting the UCI, and the UCI being used for demodulating the uplink data, wherein the first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers, such that the terminal device can perform channel sensing on at least one of the N sub-bands, and determine the transmission of the uplink data and the UCI according to the sensing result. Since the time-frequency resources for transmitting the UCI used for demodulating the uplink data occupy multiple sub-bands, the technical problem that the UCI used for demodulating the uplink data cannot be correctly transmitted because a certain sub-band to which the UCI is mapped cannot be used for transmission due to the LBT failure can be avoided, thereby improving the probability that the UCI used for demodulating the uplink data is correctly demodulated.

FIG. 3A is a schematic diagram of another method 300 for transmitting uplink signals according to an implementation of the present disclosure, as shown in FIG. 3A.

In 310, a network device receives uplink data sent by a terminal device through resources in first time-frequency resources on K sub-bands in N sub-bands and uplink control information (UCI) sent through resources in second time-frequency resources on the K sub-bands, the first time-frequency resources being used for transmitting the uplink data obtained by rate matching of a first transport block, the second time-frequency resources being used for transmitting the UCI, and the UCI being used for demodulating the uplink data.

The first time-frequency resources occupy the N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers; and 1≤K≤N, K being a positive integer.

Optionally, in an implementation of the present disclosure, a size of a sub-band is the same as a unit bandwidth at which channel sensing is performed by the terminal device, or the size of the sub-band is an integer multiple of the unit bandwidth at which the channel sensing is performed by the terminal device. For example, assuming that the unit bandwidth at which the channel sensing is performed by the terminal device is 20 MHz, the size of the sub-band may be 20 MHz, 40 MHz or 60 MHz, etc., and this is not particularly restricted in the present implementation.

It should be understood that in an implementation of the present disclosure, the first time-frequency resources occupying the N sub-bands in the frequency domain may mean that the first time-frequency resources occupy all resources on the N sub-bands in the frequency domain, or the first time-frequency resources occupy part of the resources on the N sub-bands in the frequency domain, and this is not particularly restricted in the present implementation.

It should be understood that in an implementation of the present disclosure, the second time-frequency resources occupying the M sub-bands of the N sub-bands in the frequency domain may mean that the second time-frequency resources occupy all resources on the M sub-bands in the frequency domain, or the second time-frequency resources occupy part of the resources on the M sub-bands in the frequency domain, and this is not particularly restricted in the present implementation.

Optionally, in an implementation of the present disclosure, a mode in which the uplink data is transmitted on the first time-frequency resources is a code block group (CBG) transmission mode, wherein resources in the first time-frequency resources on each of the N sub-bands are used for transmitting an integer number of CBGs.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

Optionally, the first sub-band is one of the M sub-bands.

Optionally, the first sub-band is any one of the M sub-bands.

Optionally, the resources in the second time-frequency resources on each of the M sub-bands are used to transmit all the information included in the UCI. Further, optionally, the resources in the second time-frequency resources on each of the M sub-bands are used to repeatedly transmit UCI data obtained by UCI information rate matching, or the resources in the second time-frequency resources on each of the M sub-bands are used to transmit different redundancy versions of UCI data obtained by the UCI information rate matching. For example, if M=2, sub-band 1 is used to transmit the redundancy version 0 of UCI data, and sub-band 2 is used to transmit the redundancy version 2 of UCI data. Optionally, obtaining the UCI data by the UCI information rate matching includes obtaining UCI data matched with the second time-frequency resources through processes such as coding, interleaving, bit deletion and modulation of the UCI.

Optionally, all the information included in the UCI may include but is not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Optionally, in an implementation of the present disclosure, the indicator for COT sharing may be used to indicate whether resources in a transmission opportunity subsequent to successful channel access of the terminal device can be used by other devices for communication transmission. For example, if the indicator for COT sharing indicates that the COT can be shared, the resources in the transmission opportunity subsequent to the successful channel access of the terminal device can be used by another communication device for communication transmission, where another communication device can be a network device or another terminal device different from the terminal device mentioned above, and this is not restricted in an implementation of the present disclosure.

In this mode, as long as one sub-band can be used for transmission, the UCI can be correctly demodulated, thus ensuring the correct transmission of the uplink data on the sub-band. Because the UCI in all sub-bands needs to be indicated on each sub-band, signaling overhead is relatively large.

In another specific implementation process, resources in the second time-frequency resources on the i-th sub-band in the M sub-bands can be specifically used to transmit the (k*M+i)-th modulation symbol included in the UCI, where $1 \leq i \leq M$, and $k \geq 0$, both i and k being integers.

For example, taking the UCI mapping to four sub-bands as an example, during the mapping, modulation symbol 1 is on sub-band 1, modulation symbol 2 is on sub-band 2, modulation symbol 3 is on sub-band 3, modulation symbol 4 is on sub-band 4, modulation symbol 5 is on sub-band 1, modulation symbol 6 is on sub-band 2, modulation symbol 7 is on sub-band 3, modulation symbol 8 is on sub-band 4, and so on.

In another specific implementation process, resources in the second time-frequency resources on the p-th sub-band of the M sub-bands can be specifically used to transmit the (k*M+p)-th bit included in the UCI, where $1 \leq p \leq M$, and $k \geq 0$, both p and k being integers.

For example, taking the UCI mapping to 4 sub-bands as an example, during the mapping, the 1st, 5th, 9th, 13th, ..., (k*M+1)-th bits are on sub-band 1; the 2nd, 6th, 10th, 14th, (k*M+2)-th bits are on sub-band 2; the 3rd, 7th, 11th, 15th, ..., (k*M+3)-th bits are on sub-band 3; and the 4th, 8th, 12th, 16th, ..., (k*M+4)-th bits are on sub-band 4. If a modulation order is 2, on sub-band 1, the first modulation symbol includes the first and fifth bits, the second modulation symbol includes the ninth and thirteenth bits, etc.; on sub-band 2, the first modulation symbol includes the second and sixth bits, the second modulation symbol includes the tenth and fourteenth bits, etc.; and so on.

Optionally, in a possible implementation mode of the implementation, a size of the second time-frequency resources may be determined by a code rate of the UCI.

It should be understood that in the case of low code rate, even if the sub-bands to which the UCI is mapped cannot be used for transmission due to the LBT failure, there is a probability that the UCI mapped to other sub-bands can be demodulated correctly.

Optionally, in a possible implementation mode of the implementation, the code rate of the UCI may be determined by the value of M.

For example, when M=1, the code rate can be a reference value, which is denoted as x; when M=2, the code rate can be x/2; when M=3, the code rate can be x/3; and when M=4, the code rate can be x/4. As an example but not a limitation, the value of x may be ½.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

Optionally, the second sub-band is one of the M sub-bands.

Optionally, the second sub-band is any one of the M sub-bands.

For example, the first sub-UCI may include but is not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:
a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In this mode, if there is a sub-band that cannot be used for transmission, only the UCI of that sub-band will be affected such that it cannot be demodulated correctly, and the UCI of other sub-bands that can be used for transmission can still be demodulated correctly, thus ensuring the correct transmission of the uplink data on the sub-bands. In this implementation, the terminal device may determine the first time-frequency resources and the second time-frequency resources, the first time-frequency resources being used for transmitting the uplink data obtained by rate matching of the first transport block, the second time-frequency resources being used for transmitting the UCI, and the UCI being used for demodulating the uplink data. Wherein the first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers. After determining the first time-frequency resources and the second time-frequency resources, the terminal device can perform channel sensing on at least one of the N sub-bands, and determine the transmission of the uplink data and the UCI according to the sensing result.

Optionally, in a possible implementation mode of the implementation, the terminal device may further determine that K sub-bands of the N sub-bands can be used according to the sensing result, where 1≤K≤N, K being a positive integer. Then, the terminal device can send the uplink data through resources in the first time-frequency resources on the K sub-bands, and send the UCI through resources in the second time-frequency resources on the K sub-bands.

In this implementation process, when the terminal device detects that only K sub-bands in the N sub-bands can be used due to the LBT, for the case that there are transmission resources for the UCI on all sub-bands, i.e., the N sub-bands (i.e., M=N), although the terminal device may not get the transmission opportunity for all sub-bands (i.e., K<N) in the event of the LBT, since there are the transmission resources for the UCI on each sub-band, as long as one sub-band can be used for transmission, the UCI can be demodulated correctly, thereby ensuring the correct transmission of the uplink data on the sub-bands.

In this implementation process, when the terminal device detects that only K sub-bands in the N sub-bands can be used due to the LBT, for the case that there are transmission resources for the UCI on only part of the sub-bands, i.e., the M sub-bands (i.e. M<N), if the terminal device determines that the M sub-bands are included in the K sub-bands which can be used, the terminal device can normally implement the transmission of the UCI on the transmission resources for the UCI. In this way, the UCI can be correctly demodulated, thus ensuring the correct transmission of the uplink data on the sub-bands.

Optionally, before 310, the network device determines that K sub-bands in the N sub-bands are sub-bands that can be used by the terminal device (i.e., sub-bands that are used by the terminal device to transmit the uplink data and the UCI), where 1≤K≤N, K being a positive integer. For example, the network device can detect signals on each of the N sub-bands to determine whether the sub-band is a sub-band that can be used by the terminal device.

As an example but not a limitation, the network device may perform blind detection on demodulation reference signals on each of the N sub-bands or the UCI on each of the N sub-bands. If the network device detects that there are the demodulation reference signals or UCI sent by the terminal device on a certain sub-band, then the network device determines that the sub-band is a sub-band which can be used by the terminal device, or, if the network device does not detect the demodulation reference signals or UCI sent by the terminal device on a certain sub-band, then the network device determines that the sub-band is a sub-band which cannot be used by the terminal device. The demodulation reference signals are reference signals for demodulating the UCI or the uplink data.

It should be noted that under the premise of no conflict, various implementations described in the present disclosure and/or technical features in each of the implementations can be arbitrarily combined with each other, and the technical solutions obtained subsequent to the combination should also fall into the protection scope of the present disclosure.

In this implementation, the uplink data sent by the terminal device through resources in the first time-frequency resources on K sub-bands in N sub-bands and the UCI sent through resources in the second time-frequency resources on the K sub-bands are received by the network device, where the first time-frequency resources occupy the N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers. Since the time-frequency resources for transmitting the UCI used for demodulating the uplink data occupy multiple sub-bands, the technical problem that the UCI used for demodulating the uplink data cannot be correctly transmitted because a certain sub-band to which the UCI is mapped cannot be used for transmission due to the LBT failure can be avoided, thereby improving the probability that the UCI used for demodulating the uplink data is correctly demodulated.

FIG. 3B is a schematic diagram of another method 301 for transmitting uplink signals according to an implementation of the present disclosure, as shown in FIG. 3B.

In 320, a network device receives uplink data sent by a terminal device through first time-frequency resources and uplink control information (UCI) sent through second time-frequency resources, the first time-frequency resources being used for transmitting the uplink data obtained by rate matching of a first transport block, the second time-frequency resources being used for transmitting the UCI, and the UCI being used for demodulating the uplink data.

The first time-frequency resources occupy the N sub-bands in a frequency domain, the second time-frequency resources are resources in the first time-frequency resources, and the second time-frequency resources occupy M sub-bands in the N sub-bands in the frequency domain, where N≥2 and 1≤M<N, both N and M being positive integers.

Optionally, in an implementation of the present disclosure, a size of a sub-band is the same as a unit bandwidth at which channel sensing is performed by the terminal device, or the size of the sub-band is an integer multiple of the unit bandwidth at which the channel sensing is performed by the terminal device. For example, assuming that the unit bandwidth at which the channel sensing is performed by the terminal device is 20 MHz, the size of the sub-band may be 20 MHz, 40 MHz or 60 MHz, etc., and this is not particularly restricted in the present implementation.

It should be understood that in an implementation of the present disclosure, the first time-frequency resources occupying the N sub-bands in the frequency domain may mean that the first time-frequency resources occupy all resources on the N sub-bands in the frequency domain, or the first time-frequency resources occupy part of the resources on the N sub-bands in the frequency domain, and this is not particularly restricted in the present implementation.

It should be understood that in an implementation of the present disclosure, the second time-frequency resources occupying the M sub-bands in the N sub-bands in the frequency domain may mean that the second time-frequency resources occupy all resources on the M sub-bands in the frequency domain, or the second time-frequency resources occupy part of the resources on the M sub-bands in the frequency domain, and this is not particularly restricted in the present implementation.

Optionally, in an implementation of the present disclosure, a mode in which the uplink data is transmitted on the first time-frequency resources is a code block group (CBG) transmission mode, wherein resources in the first time-frequency resources on each of the N sub-bands are used for transmitting an integer number of CBGs.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

Optionally, the first sub-band is one of the M sub-bands.

Optionally, the first sub-band is any one of the M sub-bands.

Optionally, the resources in the second time-frequency resources on each of the M sub-bands are used to transmit all the information included in the UCI. Further, optionally, the resources in the second time-frequency resources on each of the M sub-bands are used to repeatedly transmit UCI data obtained by UCI information rate matching, or the resources in the second time-frequency resources on each of the M sub-bands are used to transmit different redundancy versions of UCI data obtained by the UCI information rate matching. For example, if M=2, sub-band 1 is used to transmit the redundancy version 0 of UCI data, and sub-band 2 is used to transmit the redundancy version 2 of UCI data. Optionally, obtaining the UCI data by the UCI information rate matching includes obtaining UCI data matched with the second time-frequency resources through processes such as coding, interleaving, bit deletion and modulation of the UCI.

Optionally, all the information included in the UCI may include but is not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Optionally, in an implementation of the present disclosure, the indicator for COT sharing may be used to indicate whether resources in a transmission opportunity subsequent to successful channel access of the terminal device can be used by other devices for communication transmission. For example, if the indicator for COT sharing indicates that the COT can be shared, the resources in the transmission opportunity subsequent to the successful channel access of the terminal device can be used by another communication device for communication transmission, where another communication device can be a network device or another terminal device different from the terminal device mentioned above, and this is not restricted in an implementation of the present disclosure.

In another specific implementation process, resources in the second time-frequency resources on the i-th sub-band in the M sub-bands can be specifically used to transmit the (k*M+i)-th modulation symbol included in the UCI, where $1 \leq i \leq M$, and $k \geq 0$, both i and k being integers.

For example, taking the UCI mapping to four sub-bands as an example, during the mapping, modulation symbol 1 is on sub-band 1, modulation symbol 2 is on sub-band 2, modulation symbol 3 is on sub-band 3, modulation symbol 4 is on sub-band 4, modulation symbol 5 is on sub-band 1, modulation symbol 6 is on sub-band 2, modulation symbol 7 is on sub-band 3, modulation symbol 8 is on sub-band 4, and so on.

In another specific implementation process, resources in the second time-frequency resources on the p-th sub-band of the M sub-bands can be specifically used to transmit the (k*M+p)-th bit included in the UCI, where $1 \leq p \leq M$, and $k \geq 0$, both p and k being integers.

For example, taking the UCI mapping to 4 sub-bands as an example, during the mapping, the 1st, 5th, 9th, 13th, . . . , (k*M+1)-th bits are on sub-band 1; the 2nd, 6th, 10th, 14th, (k*M+2)-th bits are on sub-band 2; the 3rd, 7th, 11th, 15th, . . . , (k*M+3)-th bits are on sub-band 3; and the 4th, 8th, 12th, 16th, . . . , (k*M+4)-th bits are on sub-band 4. If a modulation order is 2, on sub-band 1, the first modulation symbol includes the first and fifth bits, the second modulation symbol includes the ninth and thirteenth bits, etc.; on sub-band 2, the first modulation symbol includes the second and sixth bits, the second symbol includes the tenth and fourteenth bits, etc.; and so on.

Optionally, in a possible implementation mode of the implementation, a size of the second time-frequency resources may be determined by a code rate of the UCI.

It should be understood that in the case of low code rate, even if the sub-bands to which the UCI is mapped cannot be used for transmission due to the LBT failure, there is a probability that the UCI mapped to other sub-bands can be demodulated correctly.

Optionally, in a possible implementation mode of the implementation, the code rate of the UCI may be determined by the value of M.

For example, when M=1, the code rate can be a reference value, which is denoted as x; when M=2, the code rate can be x/2; when M=3, the code rate can be x/3; and when M=4, the code rate can be x/4. As an example but not a limitation, the value of x may be ½.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

Optionally, the second sub-band is one of the M sub-bands.

Optionally, the second sub-band is any one of the M sub-bands.

For example, the first sub-UCI may include but is not limited to at least one of:
  a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:
  a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In this implementation, the terminal device may determine the first time-frequency resources and the second time-frequency resources, the first time-frequency resources being used for transmitting the uplink data obtained by rate matching of the first transport block, the second time-frequency resources being used for transmitting the UCI, and the UCI being used for demodulating the uplink data. The first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers. After determining the first time-frequency resources and the second time-frequency resource, the terminal device can perform channel sensing on at least one of the N sub-bands, and determine the transmission of the uplink data and the UCI according to the sensing result.

In a specific implementation process, after determining the first time-frequency resources and the second time-frequency resource, the terminal device can determine that K sub-bands in the N sub-bands can be used according to the sensing result, where 1≤K≤N, K being a positive integer. Since the terminal device cannot guarantee that the UCI can be transmitted normally, the terminal device may not transmit the uplink data and the UCI on the K sub-bands.

In this implementation process, when the terminal device detects that only K sub-bands in the N sub-bands can be used due to the LBT, for the case that there are transmission resources for the UCI on only part of the sub-bands, i.e., the M sub-bands (i.e. M<N), if it is determined that the terminal device do not get the transmission opportunity for all sub-bands (i.e., K<N), the terminal device may not implement the transmission of the uplink data and the UCI any more.

Optionally, before 320, the network device determines that K sub-bands in the N sub-bands are sub-bands that can be used by the terminal device (i.e., sub-bands that are used by the terminal device to transmit the uplink data and the UCI), where 1≤K≤N, K being a positive integer. For example, the network device can detect signals on each of the N sub-bands to determine whether the sub-band is a sub-band that can be used by the terminal device.

As an example but not a limitation, the network device may perform blind detection on demodulation reference signals on each of the N sub-bands or the UCI on each of the N sub-bands. If the network device detects that there are the demodulation reference signals or UCI sent by the terminal device on a certain sub-band, then the network device determines that the sub-band is a sub-band which can be used by the terminal device, or, if the network device does not detect the demodulation reference signals or UCI sent by the terminal device on a certain sub-band, then the network device determines that the sub-band is a sub-band which cannot be used by the terminal device. The demodulation reference signals are reference signals for demodulating the UCI or the uplink data.

Optionally, before 320, the network device determines that the N sub-bands are sub-bands that can be used by the terminal device (i.e., sub-bands that can be used by the terminal device to transmit the uplink data and the UCI). For example, the network device can determine whether the N sub-bands are sub-bands that can be used by the terminal device by detecting the signals transmitted on the N sub-bands.

Optionally, if the network device determines that the all N sub-bands are sub-bands that can be used by the terminal device, the network device performs step 320.

Optionally, if the network device determines that at least one of the N sub-bands is a sub-band that cannot be used by the terminal device, the network device will not receive the uplink data or the UCI.

It should be noted that under the premise of no conflict, various implementations described in the present disclosure and/or technical features in each of the implementations can be arbitrarily combined with each other, and the technical solutions obtained subsequent to the combination should also fall into the protection scope of the present disclosure.

In this implementation, the uplink data sent by the terminal device through the first time-frequency resources and the UCI sent through the second time-frequency resources are received by the network device, where the first time-frequency resources occupy the N sub-bands in the frequency domain, the second time-frequency resources are resources in the first time-frequency resources, and the second time-frequency resources occupy M sub-bands of the N sub-bands in the frequency domain, where N≥2 and M≥1, both N and M being positive integers. Since the terminal device implements uplink transmission only when obtaining the channel use right of the sub-bands to which the UCI is mapped, the technical problem that the UCI used for demodulating the uplink data cannot be correctly transmitted is solved, thereby improving the probability that the UCI used for demodulating the uplink data is correctly demodulated.

FIG. 4 is a schematic block diagram of a terminal device 400 according to an implementation of the present disclosure, as shown in FIG. 4. This implementation provides the terminal device 400 for executing the method in the implementation corresponding to FIG. 2A.

Specifically, the terminal device 400 includes function modules for executing the method in the implementation corresponding to FIG. 2A. The terminal device 400 may include a determining unit 410 and a transmitting unit 420.

The determining unit 410 is configured to determine first time-frequency resources and second time-frequency resources, the first time-frequency resources being used for transmitting uplink data obtained by rate matching of a first transport block, the second time-frequency resources being used for transmitting uplink control information (UCI), and the UCI being used for demodulating the uplink data, wherein the first time-frequency resources occupy N sub-bands in a frequency domain, the second time-frequency resources are resources in the first time-frequency resources, and the second time-frequency resources occupy M sub-bands in the N sub-bands in the frequency domain, where N≥2 and M≥1, both N and M being positive integers. The transmitting unit 420 is configured to perform channel sensing on at least one of the N sub-bands, and determine the transmission of the uplink data and the UCI according to the sensing result.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

In another specific implementation process, resources in the second time-frequency resources on the i-th sub-band in the M sub-bands can be specifically used to transmit the (k*M+i)-th modulation symbol included in the UCI, where 1≤i≤M, and k≥0, both i and k being integers.

In another specific implementation process, resources in the second time-frequency resources on the p-th sub-band of the M sub-bands can be specifically used to transmit the (k*M+p)-th bit included in the UCI, where 1≤p≤M, and k≥0, both p and k being integers.

Optionally, in a possible implementation mode of the implementation, a size of the second time-frequency resources may be determined by a code rate of the UCI.

Optionally, in a possible implementation mode of the implementation, the code rate of the UCI may be determined by the value of M.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

For example, the first sub-UCI may include but is not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:

a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In another specific implementation process, the transmitting unit 420 may be further configured to determine that K sub-bands in the N sub-bands can be used according to the sensing result, where $1 \leq K \leq N$, K being a positive integer; and send the uplink data through resources in the first time-frequency resources on the K sub-bands and send the UCI through resources in the second time-frequency resources on the K sub-bands.

In a specific implementation process, the transmitting unit 420 may be further configured to determine that K sub-bands in the N sub-bands can be used according to the sensing result, where $1 \leq K \leq N$, K being a positive integer; and not to send the uplink data and the UCI on the K sub-bands.

FIG. 5A is a schematic block diagram of a network device 500 according to an implementation of the present disclosure, as shown in FIG. 5A. The present implementation provides a network device for executing the method in the implementation corresponding to FIG. 3A.

Specifically, the network device 500 includes function modules for executing the method in the implementation corresponding to FIG. 3A. The network device 500 may include a receiving unit 510 configured to receive uplink data sent by a terminal device through resources in first time-frequency resources on K sub-bands in N sub-bands and uplink control information (UCI) sent through resources in second time-frequency resources on K sub-bands, the first time-frequency resources being used for transmitting the uplink data obtained by rate matching of a first transport block, the second time-frequency resources being used for transmitting the UCI, and the UCI being used for demodulating the uplink data.

The first time-frequency resources occupy the N sub-bands in a frequency domain, the second time-frequency resources are resources in the first time-frequency resources, and the second time-frequency resources occupy M sub-bands in the N sub-bands in the frequency domain, where $N \geq 2$ and $M \geq 1$, both N and M being positive integers; and $1 \leq K < N$, K being a positive integer.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

In another specific implementation process, resources in the second time-frequency resources on the i-th sub-band in the M sub-bands can be specifically used to transmit the (k*M+i)-th modulation symbol included in the UCI, where $1 \leq i \leq M$, and $k \geq 0$, both i and k being integers.

In another specific implementation process, resources in the second time-frequency resources on the p-th sub-band in the M sub-bands can be specifically used to transmit the (k*M+p)-th bit included in the UCI, where $1 \leq p \leq M$, and $k \geq 0$, both p and k being integers.

Optionally, in a possible implementation mode of the implementation, a size of the second time-frequency resources may be determined by a code rate of the UCI.

Optionally, in a possible implementation mode of the implementation, the code rate of the UCI may be determined by the value of M.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

For example, the first sub-UCI may include but is not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:

a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In this implementation, the terminal device may determine the first time-frequency resources and the second time-frequency resources, the first time-frequency resources being used for transmitting the uplink data obtained by rate matching of the first transport block, the second time-frequency resources being used for transmitting the UCI, and the UCI being used for demodulating the uplink data, wherein the first time-frequency resources occupy N sub-bands in the frequency domain, the second time-frequency resources are resources in the first time-frequency resources, and the second time-frequency resources occupy M sub-bands in the N sub-bands in the frequency domain, where $N \geq 2$ and $M \geq 1$, both N and M being positive integers. After determining the first time-frequency resources and the second time-frequency resources, the terminal device can perform channel sensing on at least one of the N sub-bands, and determine the transmission of the uplink data and the UCI according to the sensing result.

Optionally, in a possible implementation mode of the implementation, the terminal device may further determine that K sub-bands in the N sub-bands can be used according to the sensing result, where $1 \leq K \leq N$, K being a positive integer. Then, the terminal device can send the uplink data through resources in the first time-frequency resources on the K sub-bands, and send the UCI through resources in the second time-frequency resources on the K sub-bands.

In this implementation process, when the terminal device detects that only K sub-bands in the N sub-bands can be used due to the LBT, for the case that there are transmission resources for the UCI on all sub-bands, i.e., the N sub-bands, although the terminal device may not get the transmission opportunity for all sub-bands (i.e., K<N) in the event of the LBT, since there are the transmission resources for the UCI on each sub-band, as long as one sub-band can be used for transmission, the UCI can be demodulated correctly, thereby ensuring the correct transmission of the uplink data on the sub-bands.

In this implementation process, when the terminal device detects that only K sub-bands in the N sub-bands can be used due to the LBT, for the case that there are transmission resources for the UCI on only part of the sub-bands, i.e., the M sub-bands, if the terminal device determines that the M sub-bands are included in the K sub-bands which can be used, the terminal device can normally implement the transmission of the UCI on the transmission resources for the UCI. In this way, the UCI can be correctly demodulated, thus ensuring the correct transmission of the uplink data on the sub-bands.

Optionally, the receiving unit 510 may further determine that K sub-bands in the N sub-bands are sub-bands that can be used by the terminal device (i.e., sub-bands that are used by the terminal device to transmit the uplink data and the UCI), where $1 \leq K \leq N$, K being a positive integer. For example, the receiving unit 510 can detect signals on each of the N sub-bands to determine whether the sub-band is a sub-band that can be used by the terminal device.

As an example but not a limitation, the receiving unit 510 may perform blind detection on demodulation reference signals on each of the N sub-bands or the UCI on each of the N sub-bands. If the receiving unit 510 detects that there are the demodulation reference signals or UCI sent by the terminal device on a certain sub-band, then the receiving unit 510 determines that the sub-band is a sub-band which can be used by the terminal device, or if the receiving unit 510 does not detect the demodulation reference signals or UCI sent by the terminal device on a certain sub-band, then the receiving unit 510 determines that the sub-band is a sub-band which cannot be used by the terminal device. The demodulation reference signals are reference signals for demodulating the UCI or the uplink data.

FIG. 5B is a schematic block diagram of another network device 501 according to an implementation of the present disclosure, as shown in FIG. 5B. This implementation provides a network device for executing the method in the implementation corresponding to FIG. 3B.

Specifically, the network device 501 includes function modules for executing the method in the implementation corresponding to FIG. 3B. The network device 501 may include a receiving unit 520 configured to receive uplink data sent by a terminal device through first time-frequency resources and uplink control information (UCI) sent through second time-frequency resources, the first time-frequency resources being used for transmitting the uplink data obtained by rate matching of a first transport block, the second time-frequency resources being used for transmitting the UCI, and the UCI being used for demodulating the uplink data.

The first time-frequency resources occupy the N sub-bands in a frequency domain, the second time-frequency resources are resources in the first time-frequency resources, and the second time-frequency resources occupy M sub-bands in the N sub-bands in the frequency domain, where $N \geq 2$ and $1 \leq M < N$, both N and M being positive integers.

Optionally, in an implementation of the present disclosure, a size of a sub-band is the same as a unit bandwidth at which channel sensing is performed by the terminal device, or the size of the sub-band is an integer multiple of the unit bandwidth at which the channel sensing is performed by the terminal device. For example, assuming that the unit bandwidth at which the channel sensing is performed by the terminal device is 20 MHz, the size of the sub-band may be 20 MHz, 40 MHz or 60 MHz, etc., and this is not particularly restricted in the present implementation.

It should be understood that in an implementation of the present disclosure, the first time-frequency resources occupying the N sub-bands in the frequency domain may mean that the first time-frequency resources occupy all resources on the N sub-bands in the frequency domain, or the first time-frequency resources occupy part of the resources on the N sub-bands in the frequency domain, and this is not particularly restricted in the present implementation.

It should be understood that in an implementation of the present disclosure, the second time-frequency resources occupying the M sub-bands in the N sub-bands in the frequency domain may mean that the second time-frequency resources occupy all resources on the M sub-bands in the frequency domain, or the second time-frequency resources occupy part of the resources on the M sub-bands in the frequency domain, and this is not particularly restricted in the present implementation.

Optionally, in an implementation of the present disclosure, a mode in which the uplink data is transmitted on the first time-frequency resources is a code block group (CBG) transmission mode, wherein resources in the first time-frequency resources on each of the N sub-bands are used for transmitting an integer number of CBGs.

Optionally, in a possible implementation mode of the implementation, M=N, and the second time-frequency resources occupy each of the N sub-bands in the frequency domain.

Optionally, in a possible implementation mode of the implementation, M<N, and the second time-frequency resources occupy part of the N sub-bands in the frequency domain.

In a specific implementation process, first sub-time-frequency resources in the second time-frequency resources can be specifically used to transmit all information included in the UCI. The first sub-time frequency resources can be resources in the second time-frequency resources on a first sub-band in the M sub-bands, as shown in FIG. 2B (in FIG. 2B, M=N).

Optionally, all the information included in the UCI may include but not limited to at least one of:

a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Optionally, in an implementation of the present disclosure, the indicator for COT sharing may be used to indicate whether resources in a transmission opportunity subsequent to successful channel access of the terminal device can be used by other devices for communication transmission. For example, if the indicator for COT sharing indicates that the COT can be shared, the resources in the transmission opportunity subsequent to the successful channel access of the terminal device can be used by another communication device for communication transmission, where another communication device can be a network device or another terminal device different from the terminal device mentioned above, and this is not restricted in an implementation of the present disclosure.

In another specific implementation process, resources in the second time-frequency resources on the i-th sub-band in the M sub-bands can be specifically used to transmit the (k*M+i)-th modulation symbol included in the UCI, where $1 \leq i \leq M$, and $k \geq 0$, both i and k being integers.

In another specific implementation process, resources in the second time-frequency resources on the p-th sub-band of the M sub-bands can be specifically used to transmit the (k*M+p)-th bit included in the UCI, where $1 \leq p \leq M$, and $k \geq 0$, both p and k being integers.

Optionally, in a possible implementation mode of the implementation, a size of the second time-frequency resources may be determined by a code rate of the UCI.

It should be understood that in the case of low code rate, even if the sub-bands to which the UCI is mapped cannot be used for transmission due to the LBT failure, there is a probability that the UCI mapped to other sub-bands can be demodulated correctly.

Optionally, in a possible implementation mode of the implementation, the code rate of the UCI may be determined by the value of M.

For example, when M=1, the code rate can be a reference value, which is denoted as x; when M=2, the code rate can be x/2; when M=3, the code rate can be x/3; and when M=4, the code rate can be x/4. As an example but not a limitation, the value of x may be ½.

Optionally, in a possible implementation mode of the implementation, the code rate of the UCI may be determined by a code rate of the uplink data.

Optionally, in a possible implementation mode of the implementation, the code rate of the UCI may be configured by a network device or determined through a protocol.

In a specific implementation process, the code rate of the UCI may be specified by a standard specification.

In another specific implementation process, the code rate of the UCI may be sent by the network device to the terminal device through indication information.

The indication information may be physical layer signaling, or media access control (MAC) control element (CE) signaling, or radio resource control (RRC) signaling, and this is not particularly restricted in the present implementation.

When the indication information is the physical layer signaling, the indication information can be indicated explicitly or implicitly through the physical layer signaling.

For example, the network device indicates the code rate of the UCI to the terminal device through downlink control information (DCI) (or indicates a multiple relationship of the code rate of the UCI relative to the specified code rate).

It can be understood that the indication information can also be a combination of the RRC signaling and the physical layer signaling. For example, the network device configures at least two configurations for the code rate of the UCI, and indicates which of the at least two configurations should be used by the terminal device in one uplink transmission through the DCI.

Optionally, in a possible implementation mode of the implementation, the size of the second time-frequency resources may be determined by the code rate of the uplink data.

In another specific implementation process, second sub-time-frequency resources in the second time-frequency resources can be specifically used for transmitting first sub-UCI and second sub-UCI included in the UCI, wherein the second sub-time-frequency resources are resources in the second time-frequency resources on a second sub-band in the M sub-bands, the first sub-UCI includes demodulation information used for demodulating the uplink data, and the second sub-UCI includes demodulation information used for demodulating the uplink data on the second sub-band.

Or, the first sub-UCI includes common demodulation information for demodulating the uplink data, and the second sub-UCI includes sub-band-specific demodulation information for demodulating the uplink data on the second sub-band.

Optionally, the second sub-band is one of the M sub-bands.

Optionally, the second sub-band is any one of the M sub-bands.

For example, the first sub-UCI may include but is not limited to at least one of:
  a Hybrid Automatic Repeat reQuest (HARQ) identifier corresponding to the first transport block, an identifier of the terminal device, a cyclic redundancy check (CRC) corresponding to the first transport block, a start symbol of the first time-frequency resources, an end symbol of the first time-frequency resources, an indicator for a code block group (CBG) transmitted on the first time-frequency resources, a new data indicator (NDI) of the first transport block, a redundancy version (RV) of the first transport block, and an indicator for channel occupancy time (COT) sharing on the first time-frequency resources.

Or, as another example, the second sub-UCI may include but is not limited to at least one of:
  a start symbol of the first time-frequency resources on the second sub-band, an end symbol of the first time-frequency resources on the second sub-band, an indicator for a CBG transmitted on the second sub-band, an NDI of the CBG transmitted on the second sub-band, an RV of the CBG transmitted on the second sub-band, a CRC corresponding to the CBG transmitted on the second sub-band, and an indicator for channel occupation time (COT) sharing on the second sub-band.

In this mode, if there is a sub-band that cannot be used for transmission, only the UCI of that sub-band will be affected such that it cannot be demodulated correctly, and the UCI of other sub-bands that can be used for transmission can still be demodulated correctly, thus ensuring the correct transmission of the uplink data on the sub-bands.

In this implementation, the terminal device may determine the first time-frequency resources and the second time-frequency resources, the first time-frequency resources being used for transmitting the uplink data obtained by rate matching of the first transport block, the second time-frequency resources being used for transmitting the UCI, and the UCI being used for demodulating the uplink data. The first time-frequency resources occupy N sub-bands in the frequency domain, the second time-frequency resources are resources in the first time-frequency resources, and the second time-frequency resources occupy M sub-bands in the N sub-bands in the frequency domain, where N≥2 and M≥1, both N and M being positive integers. After determining the first time-frequency resources and the second time-frequency resource, the terminal device can perform channel sensing on at least one of the N sub-bands, and determine the transmission of the uplink data and the UCI according to the sensing result.

In a specific implementation process, after determining the first time-frequency resources and the second time-frequency resource, the terminal device can determine that K sub-bands in the N sub-bands can be used according to the sensing result, where 1≤K≤N, K being a positive integer. Since the terminal device cannot guarantee that the UCI can be transmitted normally, the terminal device may not transmit the uplink data and the UCI on the K sub-bands.

In this implementation process, when the terminal device detects that only K sub-bands in the N sub-bands can be used due to the LBT, for the case that there are transmission resources for the UCI on only part of the sub-bands, i.e., the M sub-bands, if it is determined that the terminal device do not get the transmission opportunity for all sub-bands (i.e., K<N), the terminal device may not implement the transmission of the uplink data and the UCI any more.

Optionally, the receiving unit 520 may further determine that K sub-bands in the N sub-bands are sub-bands that can be used by the terminal device (i.e., sub-bands that are used by the terminal device to transmit the uplink data and the UCI), where 1≤K≤N, K being a positive integer. For example, the receiving unit 520 can detect signals on each of the N sub-bands to determine whether the sub-band is a sub-band that can be used by the terminal device.

As an example but not a limitation, the network device may perform blind detection on demodulation reference signals on each of the N sub-bands or the UCI on each of the N sub-bands. If the receiving unit 520 detects that there are the demodulation reference signals or UCI sent by the terminal device on a certain sub-band, then the receiving unit 520 determines that the sub-band is a sub-band which can be used by the terminal device, or if the receiving unit 520 does not detect the demodulation reference signals or UCI sent by the terminal device on a certain sub-band, then the receiving unit 520 determines that the sub-band is a sub-band which cannot be used by the terminal device. The demodulation reference signals are reference signals for demodulating the UCI or the uplink data.

Optionally, the receiving unit 520 may further determine that the N sub-bands are sub-bands that can be used by the terminal device (i.e., sub-bands that can be used by the terminal device to transmit the uplink data and the UCI). For example, the receiving unit 520 can determine whether the N sub-bands are sub-bands that can be used by the terminal device by detecting the signals transmitted on the N sub-bands.

Optionally, if the receiving unit 520 determines that the all N sub-bands are sub-bands that can be used by the terminal device, the receiving unit 520 may implement the receiving of the uplink data or the UCI.

Optionally, if the receiving unit 520 determines that at least one of the N sub-bands is a sub-band that cannot be used by the terminal device, the receiving unit 520 will not implement the receiving of the uplink data or the UCI.

Figure 6:
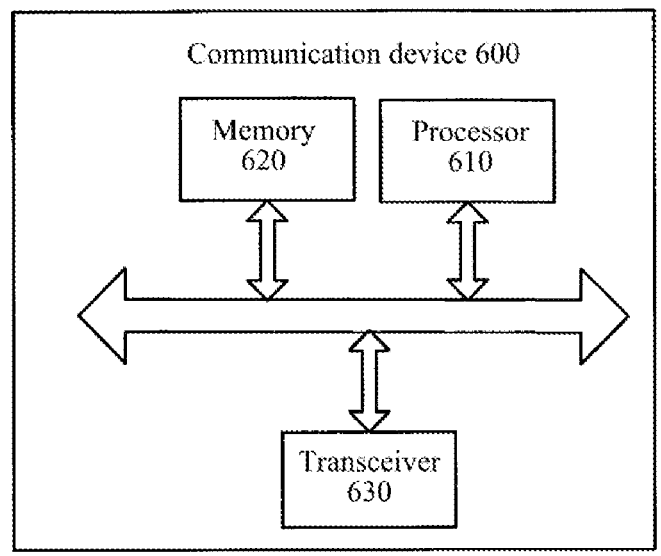
FIG. 6 is a schematic block diagram of a communication system according to an implementation of the present disclosure.

FIG. 6 is a schematic structure diagram of a communication device 600 according to an implementation of the present disclosure. The communication device 600 shown in FIG. 6 includes a processor 610. The processor 610 may call and run a computer program from a memory to implement the method in an implementation of the present disclosure.

Optionally, as shown in FIG. 6, the communication device 600 may further include the memory 620. The processor 610 may call and run the computer program from the memory 620 to implement the method in an implementation of the present disclosure.

The memory 620 may be a separate device independent of the processor 610 or may be integrated in the processor 610.

Optionally, as shown in FIG. 6, the terminal device 600 may further include a transceiver 630, and the processor 610 may control the transceiver 630 to communicate with other devices, Specifically, the transceiver 630 may send information or data to other devices or receive information or data sent by other devices.

The transceiver 630 may include a transmitter and a receiver. The transceiver 630 may further include antennas, the number of which may be one or more.

Optionally, the terminal device 600 may specifically be the network device according to an implementation of the present disclosure, and the terminal device 600 may implement the corresponding processes implemented by the network device in various methods in the implementations of the present disclosure, which will not be described repeatedly herein for brevity.

Optionally, the terminal device 600 may be specifically the terminal device according to an implementation of the present disclosure, and the terminal device 600 may implement the corresponding processes implemented by the terminal device in various methods in the implementations of the present disclosure, which will not be described repeatedly herein for brevity.

Figure 7:
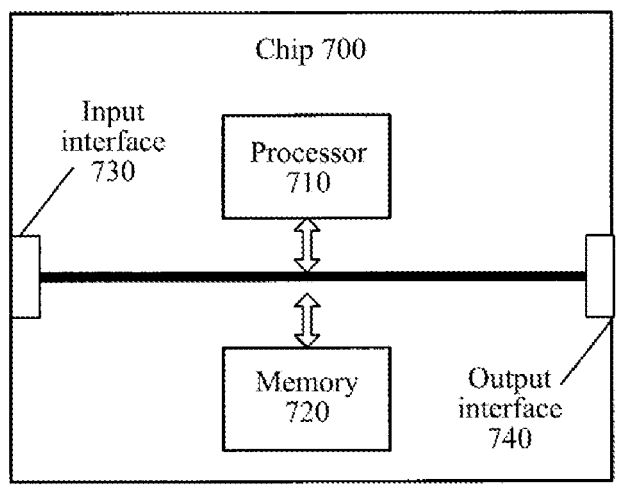
FIG. 7 is a schematic block diagram of a chip according to an implementation of the present disclosure.

FIG. 7 is a schematic structure diagram of a chip according to an implementation of the present disclosure. The chip 700 shown in FIG. 7 includes a processor 710. The processor 710 may call and run a computer program from a memory to implement the methods in the implementations of the present disclosure.

Optionally, as shown in FIG. 7, the chip 700 may further include the memory 720. The processor 710 may call and run the computer program from the memory 720 to implement the methods in the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied to the network device in the implementations of the present disclosure, and the chip may implement the corresponding processes implemented by the network device in various methods in the implementations of the present disclosure, which will not be described repeatedly herein for brevity.

Optionally, the chip may be applied to the terminal device in the implementations of the present disclosure, and the chip may implement the corresponding processes implemented by the terminal device in the various methods in the implementations of the present disclosure, which will not be described repeatedly herein for brevity.

It should be understood that the chip mentioned in an implementation of the present disclosure may be referred to as a system-level chip, a system chip, a chip system or a system-on-chip, etc.

Figure 8:
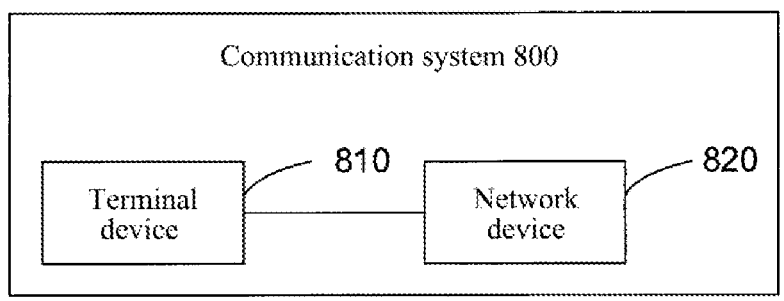
FIG. 8 is a schematic block diagram of a communication system according to an implementation of the present disclosure.

FIG. 8 is a schematic block diagram of a communication system 800 according to an implementation of the present disclosure. As shown in FIG. 8, the communication system 800 may include a terminal device 810 and a network device 820.

The terminal device 810 may be configured to implement the corresponding functions implemented by the terminal device in the above-mentioned methods, and the network device 820 may be configured to implement the corresponding functions implemented by the network device in the above-mentioned methods, which will not be described repeatedly herein for brevity.

It should be understood that the processor in an implementation of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly embodied to be implemented by a hardware decoding processor, or may be implemented by a combination of hardware and software modules in the decoding processor. The software modules may be in a conventional storage medium in the art, such as a random access memory, a flash memory, a read-only memory, a programmable read-only memory, an electrically erasable programmable memory, or a register. The storage medium is in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache.

Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described as an example but not a limitation. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure are intended to include, but not be limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program causes the computer to perform the corresponding processes implemented by the network device in various methods in the implementations of the present disclosure, which will not be described repeatedly for brevity.

Optionally, the computer readable storage medium may be applied to the terminal device in the implementations of the present disclosure, and the computer program causes the computer to perform the corresponding processes implemented by the terminal device in various methods in the implementations of the present disclosure, which will not be described repeatedly for brevity.

An implementation of the present disclosure also provides a computer program product including computer program instructions.

Optionally, the computer program product may be applied to the network device in the implementations of the present disclosure, and the computer program instructions cause the computer to perform the corresponding processes implemented by the network device in various methods in the implementations of the present disclosure, which will not be described repeatedly for brevity.

Optionally, the computer program product may be applied to the terminal device in the implementations of the present disclosure, and the computer program instructions cause the computer to perform the corresponding processes implemented by the terminal device in various methods in the implementations of the present disclosure, which will not be described repeatedly for brevity.

An implementation of the present disclosure also provides a computer program.

Optionally, the computer program may be applied to the network device in the implementations of the present disclosure. The computer program, when running on a computer, causes the computer to perform the corresponding processes implemented by the network device in various methods of the implementations of the present disclosure, which will not be described repeatedly for brevity.

Optionally, the computer program may be applied to the terminal device in the implementations of the present disclosure. The computer program, when running on a computer, causes the computer to perform the corresponding processes implemented by the terminal device in various methods in the implementations of the present disclosure, which will not be described repeatedly for brevity.

A person of ordinary skill in the art may recognize that the elements and algorithm steps in various examples described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for transmitting uplink signals, comprising:
    determining, by a terminal device, first time-frequency resources and second time-frequency resources, the first time-frequency resources being used for transmitting uplink data obtained by rate matching of a first transport block, the second time-frequency resources being used for transmitting uplink control information (UCI), wherein the UCI comprises at least one of a Hybrid Automatic Repeat reQuest (HARD) identifier corresponding to the first transport block, a new data indicator (NDI), and a redundancy version (RV), the first time-frequency resources occupy N sub-bands in a frequency domain, and the second time-frequency resources occupy each of the N sub-bands in the frequency domain, where N≥2, and N is a positive integer; and
    performing, by the terminal device, channel sensing on at least one of the N sub-bands, and determining the transmission of the uplink data and the UCI according to the sensing result,
    wherein the UCI further comprises a sharing indicator for channel occupation time (COT) corresponding to the first time-frequency resources.

2. The method according to claim 1, wherein the method further comprises:
    determining, by the terminal device, that K sub-bands of the N sub-bands are capable of being used according to the sensing result, where 1≤K<N, K being a positive integer; and
    not sending, by the terminal device, the uplink data and the UCI on the K sub-bands.

3. The method according to claim 1, wherein the code rate of the UCI is configured by a network device or determined through a protocol.

4. A method for transmitting uplink signals, comprising:
    receiving, by a network device, uplink data sent by a terminal device through resources in first time-frequency resources on K sub-bands in N sub-bands and uplink control information (UCI) sent through resources in second time-frequency resources on the K sub-bands, the first time-frequency resources being used for transmitting the uplink data obtained by rate matching of a first transport block, the second time-frequency resources being used for transmitting the UCI,
    wherein the UCI comprises at least one of a Hybrid Automatic Repeat reQuest (HARD) identifier corresponding to the first transport block, a new data indicator (NDI), and a redundancy version (RV), the first time-frequency resources occupy the N sub-bands in a frequency domain, the second time-frequency resources are resources in the first time-frequency resources, and the second time-frequency resources occupy each of the N sub-bands in the frequency domain, where N≥2, and N is a positive integer, and 1≤K≤N, K being a positive integer, and
    wherein the UCI further comprises a sharing indicator for channel occupation time (COT) corresponding to the first time-frequency resources.

5. The method according to claim 4, wherein the method further comprises:
    determining, by the network device, whether K sub-bands of the N sub-bands are capable of being used by detecting signals on each of the N sub-bands, where 1≤K<N, K being a positive integer.

6. The method according to claim 4, wherein the code rate of the UCI is configured by a network device or determined through a protocol.

7. A terminal device, comprising: a processor and a memory for storing a computer program, and the processor is configured to call and run the computer program stored in the memory to determine first time-frequency resources and second time-frequency resources, the first time-frequency resources being used for transmitting uplink data obtained by rate matching of a first transport block, the second time-frequency resources being used for transmitting uplink control information (UCI), wherein the UCI comprises at least one of a Hybrid Automatic Repeat reQuest (HARD) identifier corresponding to the first transport block, a new data indicator (NDI), and a redundancy version (RV), the first time-frequency resources occupy N sub-bands in a frequency domain, and the second time-frequency resources occupy each of the N sub-bands in the frequency domain, where N≥2, and N is a positive integer; and
    perform channel sensing on at least one of the N sub-bands, and determine the transmission of the uplink data and the UCI according to the sensing result,
    wherein the UCI further comprises a sharing indicator for channel occupation time (COT) corresponding to the first time-frequency resources.

8. The terminal device according to claim 7, wherein the processor is further configured to call and run the computer program stored in the memory to:
    determine that K sub-bands of the N sub-bands are capable of being used according to the sensing result, where 1≤K<N, K being a positive integer; and
    not send the uplink data and the UCI on the K sub-bands.

9. The terminal device according to claim 7, wherein the code rate of the UCI is configured by a network device or determined through a protocol.

10. A network device, comprising: a processor and a memory, wherein the memory is configured to store a computer program, and the processor is configured to call and run the computer program stored in the memory to receive uplink data sent by a terminal device through resources in first time-frequency resources on K sub-bands in N sub-bands and uplink control information (UCI) sent through resources in second time-frequency resources on K sub-bands, the first time-frequency resources being used for transmitting the uplink data obtained by rate matching of a first transport block, the second time-frequency resources being used for transmitting the UCI,
    wherein the UCI comprises at least one of a Hybrid Automatic Repeat reQuest (HARD) identifier corresponding to the first transport block, a new data indicator (NDI), and a redundancy version (RV), the first time-frequency resources occupy the N sub-bands in a frequency domain, the second time-frequency resources are resources in the first time-frequency resources, and the second time-frequency resources occupy each of the N sub-bands in the frequency domain, where N≥2, and N is a positive integer; and 1≤K≤N, K being a positive integer, and
    wherein the UCI further comprises a sharing indicator for channel occupation time (COT) corresponding to the first time-frequency resources.

11. The network device according to claim 10, wherein and the receiving unit is further configured to determine whether K sub-bands of the N sub-bands are capable of being used by detecting signals on each of the N sub-bands, where $1 \leq K < N$, K being a positive integer.

12. The network device according to claim 10, wherein the code rate of the UCI is configured by a network device or determined through a protocol.

* * * * *